United States Patent [19]

Blin et al.

[11] Patent Number: 5,611,374
[45] Date of Patent: Mar. 18, 1997

[54] THERMALLY INSULATING PIPE LAGGING AND METHOD OF MANUFACTURE

[75] Inventors: Philippe Blin, Monts; Daniel Mahin, Savonnieres, both of France

[73] Assignee: Hutchinson, Paris, France

[21] Appl. No.: 338,612

[22] PCT Filed: Mar. 29, 1994

[86] PCT No.: PCT/FR94/00348

§ 371 Date: Nov. 23, 1994

§ 102(e) Date: Nov. 23, 1994

[87] PCT Pub. No.: WO94/23238

PCT Pub. Date: Oct. 13, 1994

[30] Foreign Application Priority Data

Mar. 30, 1993 [FR] France .................................. 93 03657

[51] Int. Cl.$^6$ ...................................................... F16L 7/14
[52] U.S. Cl. ........................... 138/149; 138/121; 138/156; 138/122; 138/133
[58] Field of Search ....................... 138/149, 121, 138/122, 151, 137, 174, 125, 126, 173, 156, 163, 129, 127, 133

[56] References Cited

U.S. PATENT DOCUMENTS

| | | | |
|---|---|---|---|
| 3,060,069 | 10/1962 | Sindars . | |
| 4,417,603 | 11/1983 | Argy | 138/149 |
| 4,570,679 | 2/1986 | Schippl | 138/149 |
| 4,605,043 | 8/1986 | Grenier | 138/149 |
| 5,148,836 | 9/1992 | Lawrence | 138/149 X |
| 5,279,333 | 1/1994 | Lawrence | 138/122 X |
| 5,462,090 | 10/1995 | Winter et al. | 138/122 X |

FOREIGN PATENT DOCUMENTS

| | | |
|---|---|---|
| 0117210 | 8/1984 | European Pat. Off. . |
| 1310489 | 10/1962 | France . |
| 2313622 | 12/1976 | France . |
| 2538076 | 6/1984 | France . |
| 1589475 | 5/1981 | United Kingdom . |

*Primary Examiner*—David Scherbel
*Assistant Examiner*—Patrick F. Brinson
*Attorney, Agent, or Firm*—Dickinson, Wright, Moon, Van Dusen & Freeman

[57] ABSTRACT

Thermally insulating pipe lagging comprising a tube of compact and flexible elastomer type material designed to come into contact with the pipe to be insulated and shaped on its inside surface to have a helical groove which provides between its adjacent turns a coil filled with air or gas when the lagging is put into place so as to surround said pipe.

10 Claims, 4 Drawing Sheets

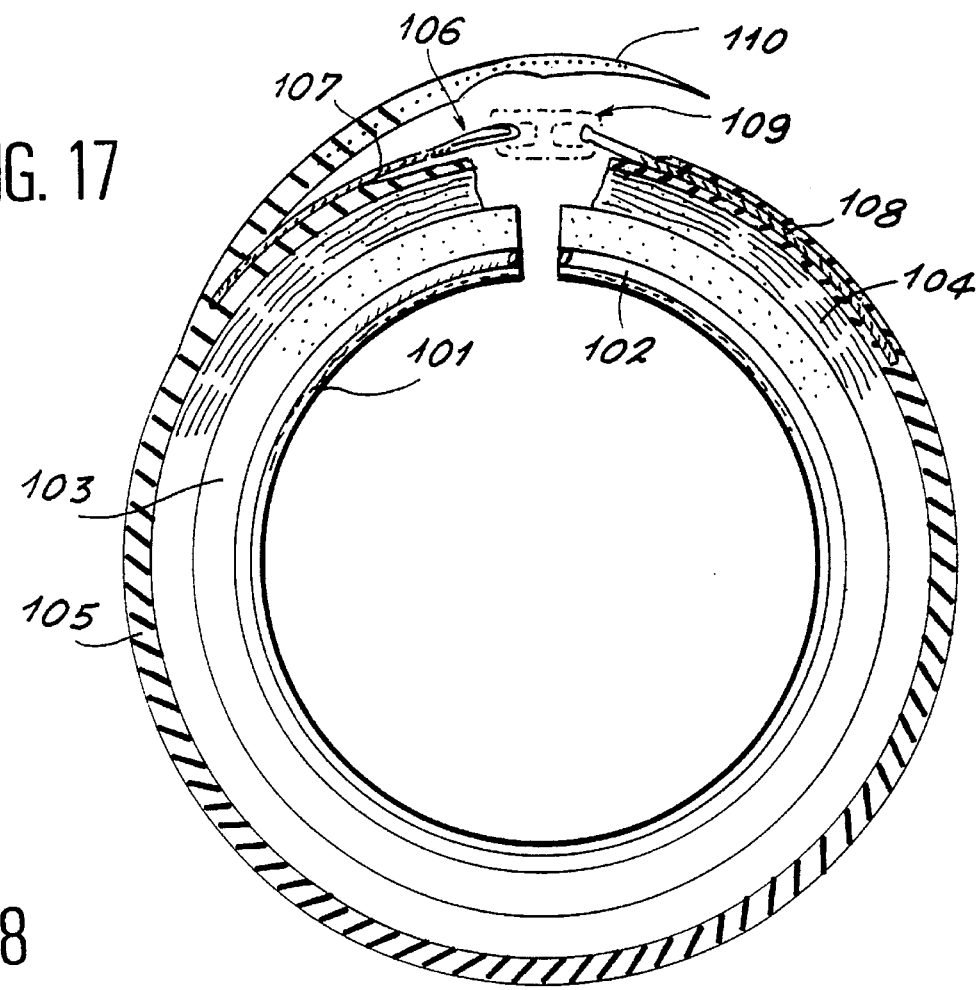
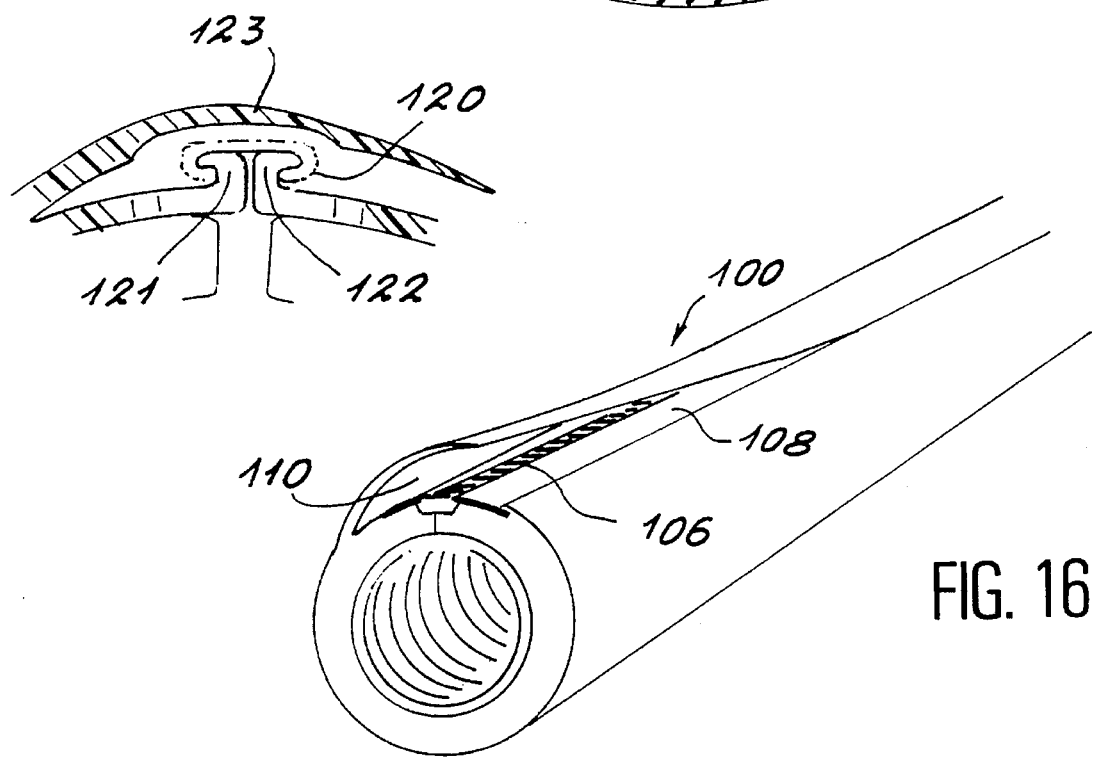

THERMALLY INSULATING PIPE LAGGING AND METHOD OF MANUFACTURE

The invention relates to thermally insulating pipe lagging and to its method of manufacture.

BACKGROUND OF THE INVENTION

Pipes or ducts that convey a fluid at a temperature that differs from the temperature of the ambient medium are generally provided with lagging that surrounds them and that performs two or three functions, namely: providing thermal insulation, protecting said pipes or ducts, and also protecting personnel who may be called upon to move about in the vicinity of said pipes or ducts when they are located at ground or floor level or within reach of a person.

Proposals have thus been made to provide such ducts or pipes with lagging made of foamed plastics material, e.g. PVC, and although such lagging is satisfactory with respect to providing thermal insulation, it is nevertheless mechanically fragile, and is also unsatisfactory for implementation in confined spaces (mine galleries, submarines, etc . . . ) where it is required that the lagging used should present a certain amount of resistance to fire and that it should not give off toxic smoke or vapor in the event of a fire. Consequently, in such applications, conventional lagging made of plastics foam is unsuitable, and instead use is made of casing based on mats of resin-impregnated fiberglass of considerable thickness, the mats being built up and allowed to set in situ, or in a variant being applied to lengths of pipe in workshops fitted for that task. Although the results obtained are satisfactory, this is achieved only at the cost of difficulty in implementation when the pipes are covered in situ, or else at the cost of a very large amount of work to dismantle the pipes, to transport them from the locations at which they are installed to lagging factories, and back again, etc . . . such that when it is necessary to equip a building or a ship that has a very large number of pipes or ducts of complex shape, then installing such insulating lagging gives rise to considerable constraints.

OBJECTS AND SUMMARY OF THE INVENTION

As a result, a general object of the invention is to provide thermally insulating pipe lagging that avoids the drawbacks of known lagging based on plastics material foam.

Another object of the invention is to provide such thermally insulating lagging suitable for being installed on a pipe or duct that is to be fitted therewith without any need for the pipe or duct to be "swaddled" in casing based on mats of resin-impregnated fiberglass.

Another object of the invention is to provide such thermally insulation pipe lagging that is flexible and which can therefore be installed on the pipes or ducts to be fitted therewith while fitting closely to the often complex shape of said pipe or duct.

Another object of the invention is to provide thermally insulating pipe lagging having good mechanical strength, which does not make the pipe or duct fitted therewith any bulkier than a pipe or duct fitted with known lagging, and which also provides thermal insulation that is at least as good as if not better than that of prior devices.

Finally, an object of the invention is to provide a method of manufacturing such lagging.

According to the invention, thermally insulating pipe lagging is characterized in that it comprises a tube made of a material of the compact and flexible elastomer type, designed to come into contact with the pipe to be insulated, and which is shaped on its inside surface with a helical groove that leaves a "coil" filled with air or gas between its adjacent turns when the lagging is in place on said pipe and surrounds it.

The air- or gas-filled "coil" provides a fraction of the insulation of the lagging, with the remainder of the insulation being provided by the structure of the lagging as described below.

According to another characteristic of the invention, in order to obtain good mechanical strength, in particular resistance to be being crushed, the lagging further comprises a helical reinforcing winding, advantageously in the form of a rod of thermoplastic material.

In an advantageous embodiment of the invention, the lagging includes an outer covering of elastomer, preferably silicone rubber, and between said outer covering and the winding that provides strength against crushing, successively and going from the outer covering towards the inside of the lagging;
a fiberglass braid; and
a layer of thermally insulating material.

This provides a flexible product which can be curved to about three times its own diameter and which can be threaded onto pipes or ducts that are to be fitted therewith, even when the pipes or ducts are complex in shape, thereby eliminating the difficult operation (that cannot be performed in situ) of "swaddling" pipes with mats of resin and fiberglass, or with analogous products.

In a first embodiment of lagging of the invention, the layer of thermally insulating material is of the ceramic paper type, or the like.

In a variant embodiment, the layer of thermally insulating material is a mastic in the form of a relatively compact foam of silicone and of ceramic, for example, which can be easily cut to shape without being damaged.

In a preferred embodiment, the innermost surface of the groove, i.e. the surface that is in contact with the pipe on which the lagging is mounted, is covered with a cloth, advantageously of the type having considerable bi-elastic deformation in two orthogonal directions and which is designed to facilitate installation of the lagging on the pipe by a "sliding" effect.

When lagging of the invention is to be installed on a pipe whose ends cannot be separated from the couplings holding it in place, the invention provides for the lagging to be split longitudinally and for the edges of the split to be provided with fastener means (of the slideway type, or strips that hold together by means of velvet and hooks, or of an analogous type).

For such split lagging, the invention advantageously also provides for a lip to be formed at the same time as the outer covering, which lip can be caused to overlie said fastener means to hide it after the lagging has been put into place on the pipe.

Under such circumstances, a method of manufacturing lagging of the invention is characterized:
a) in that a section-bar element is initially disposed on a mandrel to follow a helical winding having close-together turns for the purpose of forming the helical groove in the tube of the lagging;
b) in that a blank of said tube is formed by means of an elastomer type material in the pasty state;
c) in that reinforcement serving to provide the lagging with strength against crushing is applied to the outer surface of the blank in the form of a helically wound rod;

d) in that a thermally insulating material and a braid are disposed in succession on the blank of said tube equipped in this way;

e) in that the resulting assembly is enclosed in a covering of elastomer material;

f) in that the assembly is vulcanized; and g) in that the section-bar element installed during above step a) is then extracted and the lagging formed in this way is disengaged from the mandrel.

In an implementation of the invention the following steps are performed:

h) a textile grid is applied to the outer surface of the tube blank before the helically wound rod is put into place;

i) the thermally insulating material is constituted by paper, advantageously ceramic paper or the like, with a fiberglass braid being interposed between the paper and the helically wound rod.

In another implementation of the method, after above-specified step a), provision is made for the following steps:

b') cloth, preferably cloth having considerable bi-elastic deformation in two orthogonal directions, is placed on the section-bar element, the cloth being placed lengthwise with its margins overlapping a little;

c') the helically wound rod is applied to said cloth in order to provide the lagging with resistance to crushing;

d') the cloth and the rod are covered with a film of elastomer material;

e') the insulating material in the form of a relatively compact foam of a mastic of silicone and of ceramic is applied to said film of elastomer material;

f') the assembly is cross-linked;

g') a fiberglass braid is disposed on the cross-linked mastic;

h') the assembly formed is enclosed in a covering of elastomer material such as a silicone rubber;

i') the assembly is vulcanized; and j') thereafter the section-bar element installed during the first step is extracted and the resulting lagging is disengaged from the mandrel.

Whichever method is implemented, the invention preferably provides for using a silicone rubber as the material constituting the tube and the outer covering, and also the intermediate films, when present.

When the lagging is of the longitudinally split type, it is manufactured either as described above with reference to steps a) to g) or steps a) to i), and it is then cut along one of its generator lines, or else it is made as described above with reference to steps a) and b') to g'), which steps are followed by the blank that includes the braid covering the thermally insulating mastic being cut along one of its generator lines, after which fastener elements are installed along the edges of the split before installing the outer covering of elastomer material, which covering is optionally provided with a lip capable of being caused to overlie and hide the fastener elements, and the assembly vulcanized.

BRIEF DESCRIPTION OF THE DRAWINGS

The invention will be well understood from the following description given by way of example and with reference to the accompanying drawings, in which:

FIG. 16 is a diagrammatic perspective view of "split" lagging of the invention;

FIG. 17 is a cross-section view on a larger scale; and

FIG. 18 is a detail view of a variant.

DETAILED DESCRIPTION OF THE INVENTION

Figure 1:
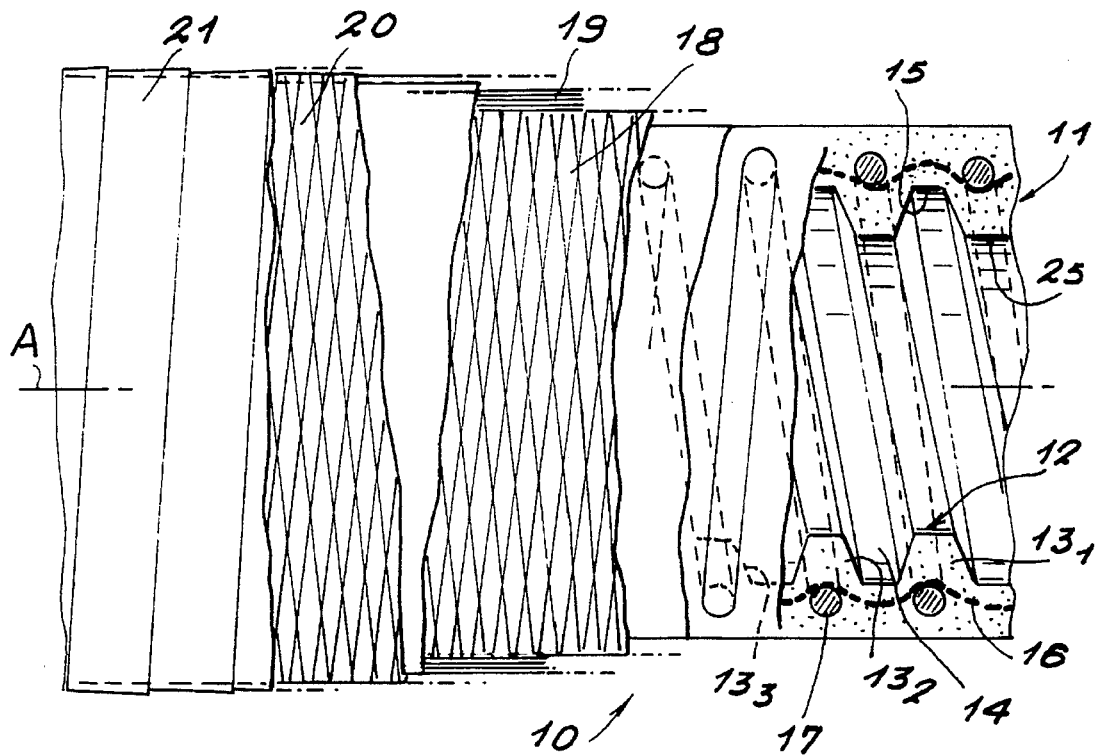
FIG. 1 is a cutaway elevation view of a first embodiment of lagging of the invention.

Reference is made initially to FIG. 1 which shows a first embodiment 10 of thermally insulating pipe lagging of the invention. The cylindrical lagging 10 constitutes a body of revolution about the axis A and essentially comprises the following elements, going from the inside towards the outside, it being understood that these elements together make up a unitary structure without any gaps between them, the elements being listed below for explanatory purposes only:

i) an inner tube 11 of elastomer material, advantageously of the silicone rubber type and shaped to have a helical rib 12 that serves to define between two adjacent turns $13_1$, $13_2$; $13_2$, $13_3$, etc . . . a groove which is likewise helical, constituting a "coil" 14 whose right cross-section (which is the same as that of the rib 12) is substantially trapezium-shaped in the embodiment described and shown;

ii) a fine textile grid 16 disposed close to the bottom 15 of the groove 14;

iii) reinforcement 17 substantially in contact with the textile grid 16 and embedded in the thickness of the tube 11 to provide the lagging with good mechanical strength, in particular good resistance to being crushed, the reinforcement being in the form of a rod, advantageously a round rod of thermoplastic material which is likewise disposed as a helical winding, but wound in the opposite direction to the rib 12;

iv) a first fiberglass braid 18 which contributes to holding the reinforcement 17, and which enables the lagging to be curved;

v) a thermally insulating material 19, advantageously ceramic paper stuck to the first braid 18 and secured on the braid by;

vi) a second fiberglass braid 20 which is itself enclosed in an outer covering 21 of elastomer material, advantageously a silicone rubber of the same type as that constituting the inner tube 11.

Such lagging is flexible, capable of being shaped to follow a radius of curvature equal to about three times its diameter, and when applied to a pipe, provides thermal insulation both by means of its own component parts and by means of the air or gas which is enclosed in the groove or "coil" 14.

Figure 8:
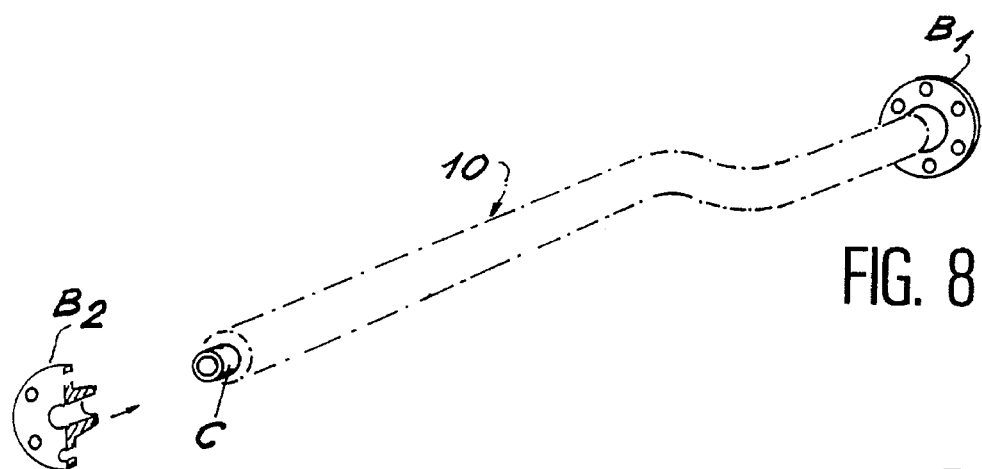
FIGS. 8 and 9 show ways in which the lagging of the invention can be installed on pipes.

As shown in FIG. 8, lagging 10 of the invention is installed on a pipe C that is to be fitted therewith merely by threading the lagging over the pipe which may continue to be secured at one of its ends by a coupling $B_1$, and then after lagging has been put into place, it is secured at its other end by means of a coupling $B_2$, with installation of the lagging 10 on the pipe C being facilitated by applying a lubricating film or the like to the inside surface 25 of the rib 12.

Figure 9:
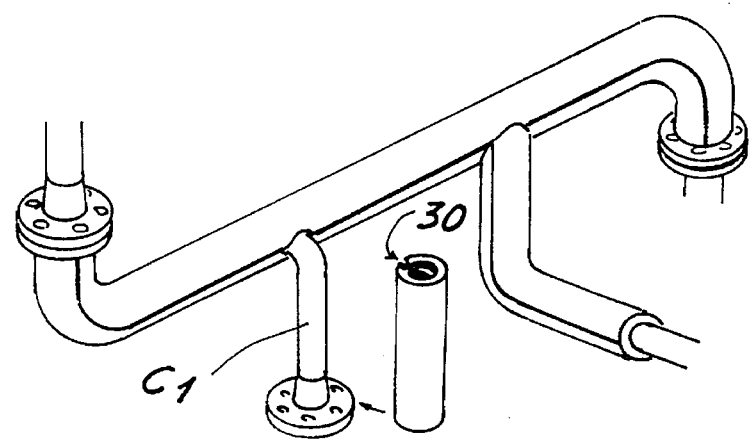

It is observed that lagging of the invention provides excellent strength against crushing, performs its thermal insulation function well, does not transmit noise, and retards fire significantly. Thus, as shown in FIG. 9, it can be used for fitting to all of the pipes or ducts in an installation that is stationary or moving, e.g. on board a ship, without it being necessary to dismantle said pipes or ducts for factory processing as has been necessary until now.

Figure 2:
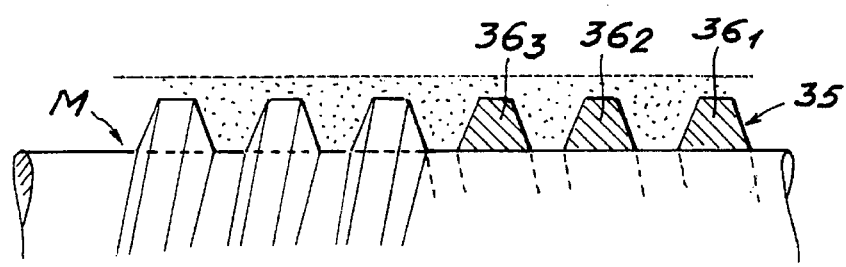
FIGS. 2 to 7 show a method of manufacturing such lagging.

In order to manufacture lagging 10 as described above, the invention proposes a method whereby a section-bar element 35 is initially applied to a mandrel M (FIG. 2), the right cross-section of the element being that of the groove 14. The element is placed on said mandrel so as to provide a helical winding with close-together turns $36_1$, $36_2$, etc . . . On the mandrel provided in this way with the section-bar element 35 (itself advantageously constituted by a thermoplastic material such as PVC or polyethylene), an elastomer material, e.g. a silicone rubber, is applied in the form of a paste which penetrates into the spaces defined by the mandrel M and the turns 36, thereby forming a blank for the inner tube 11 of the lagging.

Figure 3:
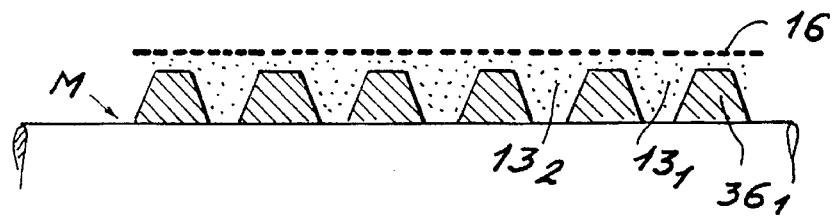
Figure 4:
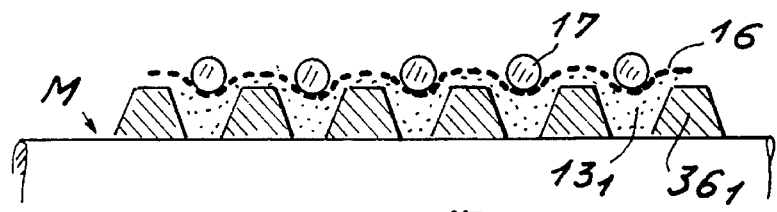

The textile grid 16 is applied to the blank formed in this way (FIG. 3) and then the reinforcement 17 is placed on said textile grid, which reinforcement is advantageously in the form of a round rod of rigid polyethylene that does not give off chlorine in the event of a fire (FIG. 4).

Figure 5:
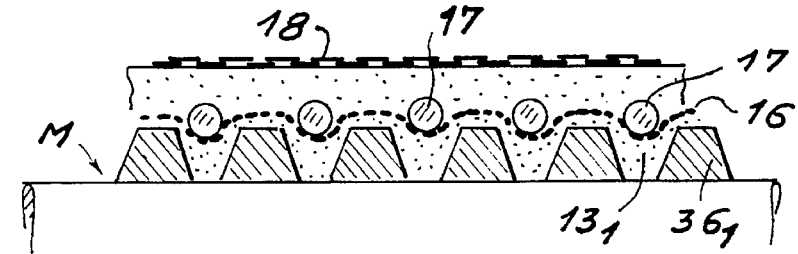
Figure 6:
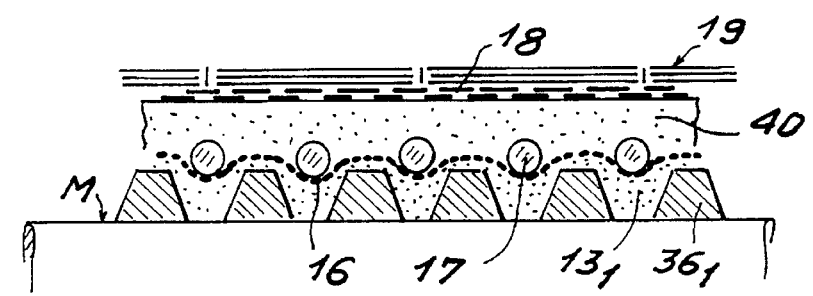

A new layer of elastomer material 40 is applied on the reinforcement 17, for the purpose of co-operating with the elastomer already in place to form the entire inner tube 11, after which the first braid 18 is placed on the outer surface of said layer 40 (FIG. 5), followed by the insulating ceramic paper or the like 19 which is placed on the braid 18 (FIG. 6). The second braid 20 is then placed on the paper (FIG. 7) and is itself provided with the outer covering 21 of elastomer material, advantageously constituted by a silicone rubber like that of the tube 11.

Figure 7:
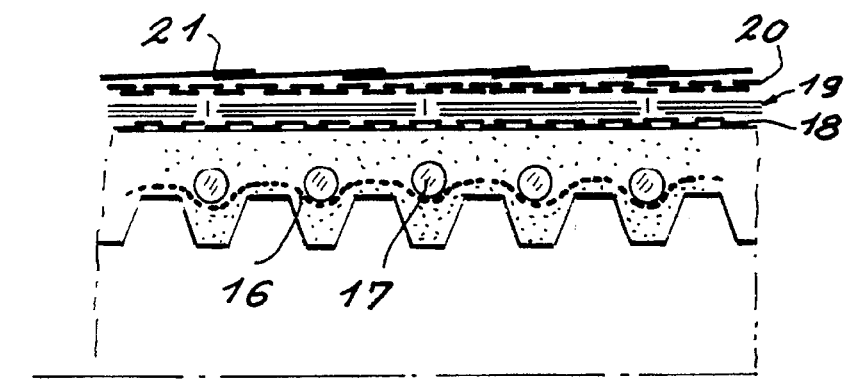

The assembly made up in this way is then vulcanized in conventional manner, after which the section-bar element 35 is extracted (merely by pulling on a free end thereof) as can be seen in the right-hand portion of FIG. 7 where it can no longer be seen over a first portion of the lagging, although it is still in contact with the mandrel M in the left-hand portion of the same figure.

Once the mandrel M has been removed, lagging 10 is obtained as shown in FIG. 1.

Given that the lagging of the invention presents sufficient "spring" effect when split longitudinally, as shown at 30 in FIG. 9, it is also possible to install the lagging on a pipe such as $C_1$ (whose ends cannot be disconnected from the couplings that hold it in place), by placing the split lagging astride the pipe and then by interconnecting the two edges of the split, e.g. by means of an appropriate adhesive.

Since the thermally insulating material forming the layer 19 of lagging 10 of the type described above (ceramic paper or the like) is likely to be damaged during the cutting of said lagging to turn it into split lagging, the invention provides another embodiment of lagging and a variant implementation of the method described above.

In the variant implementation (FIGS. 16 and 17), the lagging essentially comprises the following elements, going from the inside towards the outside, it being understood that together they form a unitary assembly without any gaps, the elements being described below for explanatory purposes only:

1) cloth 100 of the type exhibiting considerable bi-elastic deformation (200%) in two orthogonal directions is placed lengthwise, with its edges overlapping slightly, and it is designed to facilitate installation of the lagging on the pipe by means of a sliding effect;
2) a rod 102 analogous to the rod 17 in the preceding embodiment;
3) a layer of thermally insulating material 103, advantageously in the form of a relatively compact foam of a mastic of silicone and of ceramic, e.g. obtained from a matrix of silicone rubber in which ceramic fibers have been added to constitute a non-toxic product that can be cut without crumbling;
4) a fiberglass braid 104;
5) an outer covering 105 of elastomer material, advantageously a silicone rubber; and
6) fastener means 106, implemented in the embodiment described and represented by two strips 107 and 108 that are embedded in the covering 105 and that constitute a slideway fastener having a slider 109, the fastener being hidden when the lagging is in place on a pipe and the fastener is closed by means of a lip 110 integral with the outer covering 105 of the lagging.

Figure 10:
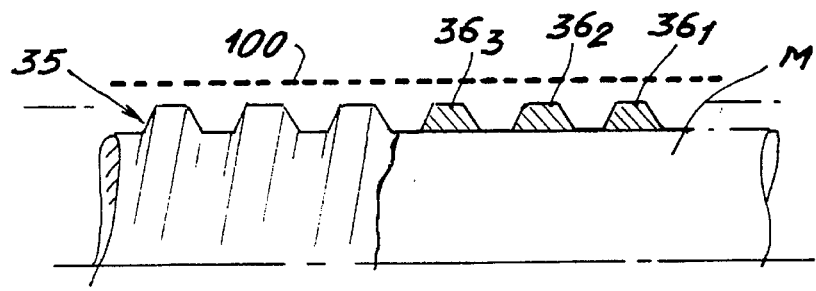
FIGS. 10 to 15 are views analogous to FIGS. 2 to 7, but for a variant method of manufacture.
Figure 11:
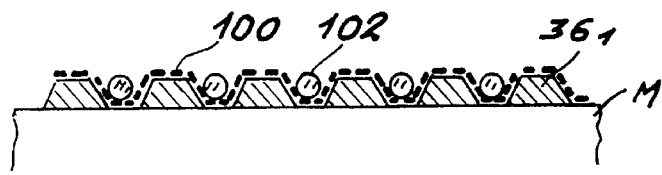
Figure 12:
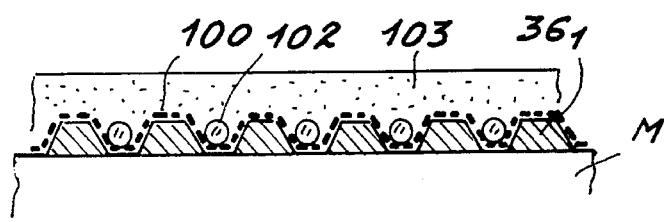

To manufacture such lagging, the invention proposes a variant of the above-described method in which the section-bar element 35 whose cross-section is that of the groove 111 is initially applied to the mandrel M (FIG. 10), the groove 111 being lined with the cloth 100 that is put into place on said section-bar element and that is held thereon by the rod 102 (FIG. 11).

Figure 13:
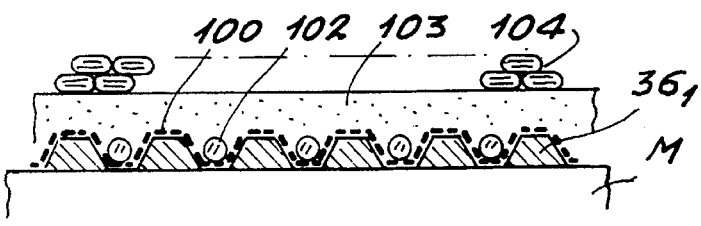
Figure 14:
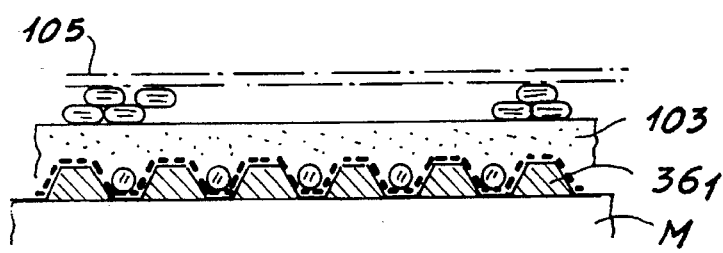
Figure 15:
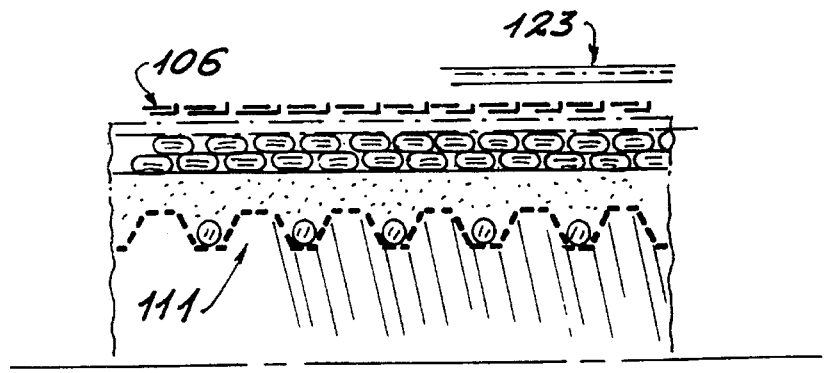

After the rod has been put into place, a film of silicone rubber is brushed onto the outside face of the cloth 100 and then the layer 103 of silicone and ceramic mastic is put into place on the film. A first cross-linking operation is then performed, e.g. by means of a hot air blower, after which the braid 104 is placed on the crossed-linked insulating layer 103 with an adhesive being interposed therebetween (FIG. 13). The blank formed in this way is then cut longitudinally and is provided with the fastener means 106 and with the outer covering 105 of silicone rubber which is simultaneously formed with the lip 110.

The assembly is then vulcanized, e.g. in an autoclave, after which the section-bar element 35 is extracted and the lagging is withdrawn from the mandrel M.

In a variant, not shown, the fastener element 106 is not a slideway fastener, but is a fastener of the velvet/hook type (Velcro) or in another variant, and as shown in FIG. 18, it is a member of the type having clips 120 that clamp together rims 121 and 122 formed on the edges of the split in the lagging, which lagging also includes a lip 123 suitable for hiding said fastener element, as in the embodiment of FIGS. 16 and 17.

EXAMPLE A

Insulating lagging 10 as described above has been made by applying a section-bar element to a mandrel M whose outside diameter was 50 mm, the right section of the section-bar element being a trapezium having a height of 5 mm, a small base of 2 mm and a long base of 4 mm, the element being wound with close-together turns at a pitch of about 4 mm.

Silicone rubber was deposited to a thickness of 0.5 mm on the mandrel prepared in this way, and then after a textile grid 16 had been installed, a new layer of pasty silicone rubber was deposited so as to form a tube 11 having a thickness of 5 mm. Reinforcement 17 constituted by a rigid round polyethylene rod having a diameter of 2.5 mm was embedded in the tube 11 and wound at a pitch of 4 mm in the opposite direction to the turns of the first section element.

After installation of the braids 18 and 19 and of insulating paper having a thickness of 3 mm, the outer covering 21 of silicone rubber was also installed to a thickness of 2 mm prior to the entire assembly being vulcanized.

When such lagging was threaded onto a tube having an outside diameter of 48.3 mm, satisfactory thermal insulation was observed, the coefficient of thermal conductivity being 0.08 W/m² 0° C.

Lagging of the invention withstands temperatures of about 250° C., withstands crushing shocks, and can be curved to about three times its own diameter.

EXAMPLE B

Insulating lagging of the split type was manufactured as described above with reference to FIGS. 10 to 17, by applying the section-bar element having the same trapezium-shaped right cross-section as that used in Example A to a mandrel M having an outside diameter of 50 mm. On the mandrel M covered in this way, a cloth having considerable bi-elastic deformation in two orthogonal directions was initially put into place lengthwise, with its margins overlapping slightly. After a solution of silicone had been deposited, reinforcement in the form of a rigid round polyethylene rod having a diameter of 2.5 mm was wound helically as in above Example A. A layer of silicone rubber was then installed to a thickness of about 0.5 mm, and then a foam of silicone and ceramic mastic was put into place on said layer to a thickness of 3 mm to 4 mm. The assembly was then vulcanized in ambient air by blowing hot air, thereby causing the foam to expand a little.

The lagging blank was then split longitudinally, and after a braid had been put into place, a new layer of silicone rubber having a thickness lying in the range 1 mm to 2 mm and optionally provided with a cloth was then applied thereto prior to vulcanizing the assembly.

We claim:

1. Thermally insulating pipe lagging of the type comprising a tube designed to come into contact with a pipe to be insulated and which is shaped on its inside surface to have a helical groove that forms a coil between adjacent turns of said groove, said coil being filled with air or gas when the lagging is in place surrounding said pipe, wherein said tube is constituted by a compact and flexible elastomer type material and said tube includes a fine textile grid or support cloth of the type having considerable bi-elastic deformation or having great deformability in two orthogonal directions, and reinforcement in the form of a helical winding.

2. Thermally insulating lagging according to claim 1, wherein said lagging includes an outer covering of elastomer and between said outer covering and the winding, wherein said winding provides strength against crushing, is provided successively from the outer covering towards the inside of the lagging with a fiberglass braid; and a layer of thermally insulating material.

3. Thermally insulating lagging according to claim 2, wherein the layer of thermally insulating material is of the ceramic paper type.

4. Thermally insulating lagging according to claim 2, wherein the layer of thermally insulating material is of a mastic in the form of a relatively compact foam of silicone and of ceramic.

5. Thermally insulating lagging according to claim 1, wherein said lagging comprises at least one generator line and said lagging is split along one of its generator lines and the edges of the split are provided with fastening means.

6. Thermally insulating lagging according to claim 5, wherein said lagging also comprises a lip suitable for being folded down over the fastening means to hide it after the lagging has been put into place on a pipe that is to be fitted therewith.

7. Thermally insulating lagging according to claim 1, wherein said reinforcement is constituted by a rod of thermoplastic material.

8. Thermally insulating lagging according to claim 1, wherein said helical winding is wound in the opposite direction to said groove.

9. Thermally insulating lagging according to claim 1, wherein said reinforcement is in the form of a helical winding facing said turns of said helical groove.

10. Thermally insulating lagging according to claim 2, wherein said elastomer is silicone rubber.

* * * * *